US006738744B2

(12) United States Patent
Kirovski et al.

(10) Patent No.: US 6,738,744 B2
(45) Date of Patent: May 18, 2004

(54) WATERMARK DETECTION VIA CARDINALITY-SCALED CORRELATION

(75) Inventors: Darko Kirovski, Redmond, WA (US); Henrique Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 09/733,576

(22) Filed: Dec. 8, 2000

(65) Prior Publication Data

US 2002/0107691 A1 Aug. 8, 2002

(51) Int. Cl.[7] .............................................. G10L 15/22
(52) U.S. Cl. ....................................... 704/273; 713/193
(58) Field of Search ........................... 704/273; 713/193

(56) References Cited

U.S. PATENT DOCUMENTS 5,687,236 A 11/1997 Moskowitz et al. .......... 380/28
5,822,360 A 10/1998 Lee et al. ................... 375/200
5,822,432 A 10/1998 Moskowitz et al.

(List continued on next page.)

FOREIGN PATENT DOCUMENTS

| | | | |
|---|---|---|---|
| EP | 0581317 | A2 | 2/1994 |
| EP | 0770498 | A2 | 5/1997 |
| EP | 0 840 513 | A2 | 5/1998 |
| EP | 0 899 948 | A1 | 3/1999 |
| EP | 11110913 | | 4/1999 |
| EP | 0 913 952 | A2 | 5/1999 |
| EP | 1 017 049 | A2 | 7/2000 |
| WO | WO 98/03014 | | 1/1998 |
| WO | WO 99/11020 | | 3/1999 |

OTHER PUBLICATIONS

Mintzer, F; G. W. Braudaway. "If One Watermark is good, are more better?" Acoustics, Speech, and Signal Processing, 1999. Proceedings., 1999 IEEE International Conference on. Mar. 19, 1999, 2067–2069.
Swanson et al., "Robust Audio Watermarking Using Perceptual Masking", Signal Processing 66, 1998, pp. 337–355.
Zhou et al., "A Generic Digital Watermarking Model", Comput. & Graphics, vol. 22, No. 4, 1998, pp. 397–403.

*Primary Examiner*—Daniel Abebe
(74) *Attorney, Agent, or Firm*—Lee & Hayes, PLLC

(57) ABSTRACT

Described herein is an audio watermarking technology for detecting watermarks in audio signals, such as a music clip. The watermark identifies the content producer, providing a signature that is embedded in the audio signal and cannot be removed. The watermark is designed to survive all typical kinds of processing and all types of malicious attacks that attempt to remove or modify the watermark from the signal. The implementations of the watermark detecting system, described herein, support quick, efficient, and accurate detection of watermarks by the specifically designed watermark detecting system. In one described implementation, a watermark detecting system employs an improved normalized covariance test to determine the presence of a watermark using less expensive materials (hardware), quicker calculations, and a more accurate test (than the original correlation test). In other described implementations, a watermark detecting system employs a cepstrum filter and dynamic processing to minimize the affect of the "noise" in the watermarked signal. The "noise" is the original content of the signal before such signal was watermarked. In still another described implementation, a watermark detecting system employs a mechanism for random detection threshold so that the act of watermark detection does not provide decipherable clues to a digital pirate as to the value or location of the embedded watermark.

37 Claims, 8 Drawing Sheets

U.S. PATENT DOCUMENTS

| | | | | | |
|---|---|---|---|---|---|
| 5,889,868 | A | | 3/1999 | Moskowitz et al. | |
| 5,905,800 | A | | 5/1999 | Moskowitz et al. | |
| 5,917,914 | A | | 6/1999 | Shaw | 380/42 |
| 5,933,798 | A | | 8/1999 | Linnartz | 702/191 |
| 5,991,426 | A | * | 11/1999 | Cox et al. | 382/100 |
| 6,024,287 | A | | 2/2000 | Takai et al. | |
| 6,064,764 | A | | 5/2000 | Bhaskaran et al. | |
| 6,131,162 | A | | 10/2000 | Yoshiura et al. | 713/176 |
| 6,192,139 | B1 | | 2/2001 | Tao | |
| 6,209,094 | B1 | | 3/2001 | Levine et al. | |
| 6,219,634 | B1 | | 4/2001 | Levine | |
| 6,256,736 | B1 | | 7/2001 | Coppersmith et al. | |
| 6,275,599 | B1 | | 8/2001 | Adler et al. | |
| 6,282,300 | B1 | | 8/2001 | Bloom et al. | |
| 6,330,672 | B1 | | 12/2001 | Shur | |
| 6,332,031 | B1 | | 12/2001 | Rhoads et al. | |
| 6,332,194 | B1 | | 12/2001 | Bloom et al. | |
| 6,334,187 | B1 | | 12/2001 | Kadono | |
| 6,408,082 | B1 | * | 6/2002 | Rhoads et al. | 382/100 |

* cited by examiner

Time
200
220
222
240
250
252
254
256
258
259
260
270
280
290

Y-axis.
y=DynamicsCurve(x)
function for non-linear
amplification/attenuation
of a given frequency
magnitude x into a new
frequency magnitude y.

510

X-axis. Magnitude of a
sample of the frequency
spectrum.

WATERMARK DETECTION VIA CARDINALITY-SCALED CORRELATION

TECHNICAL FIELD

This invention relates to protecting audio content by using watermarks. More particularly, this invention relates to improved techniques for detecting watermarks in an audio signal.

BACKGROUND

Since the earliest days of human civilization, music has existed at the crossroads of creativity and technology. The urge to organize sound has been a constant part of human nature while the tools to make and capture the resulting music have evolved in parallel with human mastery of science.

Throughout the history of audio recordings, the ability to store and transmit audio (such as music) has quickly evolved since the early days just 130 years ago. From Edison's foil cylinders to contemporary technologies (such as DVD-Audio, MP3, and the Internet), the constant evolution of prerecorded audio delivery has presented both opportunity and challenge.

Music is the world's universal form of communication, touching every person of every culture on the globe. Behind the music is a growing multi-billion dollar per year industry. This industry, however, is constantly plagued by lost revenues due to music piracy.

Protecting Rights

Piracy is not a new problem. However, as technologies change and improve, there are new challenges to protecting music content from illicit copying and theft. For instance, more producers are beginning to use the Internet to distribute music content. In this form of distribution, the content merely exists as a bit stream which, if left unprotected, can be easily copied and reproduced.

At the end of 1997, the International Federation of the Phonographic Industry (IFPI), the British Phonographic Industry, and the Recording Industry Association of America (RIAA) engaged in a project to survey the extent of unauthorized use of music on the Internet. The initial search indicated that at any one time there could be up to 80,000 infringing MP3 files on the Internet. The actual number of servers on the Internet hosting infringing files was estimated to 2,000 with locations in over 30 countries around the world. Since that survey, the availability of and interest in the digital music on the Internet has increased many times over.

Each day, the wall impeding the reproduction and distribution of infringing digital audio clips (e.g., music files) gets shorter and weaker. "Napster" is an example of an application that is weakening the wall of protection. It gives individuals access to one another's MP3 files by creating a unique file-sharing system via the Internet. Thus, it encourages illegal distribution of copies of copyrighted material.

As a result, these modern digital pirates effectively rob artists and authors of their lawful compensation. Unless technology provides for those who create music to be compensated for it, both the creative community and the musical culture at large will be impoverished.

Identifying a Copyrighted Work

Unlike tape cassettes and CDs, a digital music file has no jewel case, label, sticker, or the like on which to place the copyright notification and the identification of the author. A digital music file is a set of binary data without a detectible and unmodifiable label.

Thus, musical artists and authors are unable to inform the public that a work is protected by adhering a copyright notice to the digital music file. Furthermore, such artists and authors are unable to inform the public of any addition information, such as the identity of the copyright holder or terms of a limited license.

Digital Tags

The music industry and trade groups are especially concerned by digital recording because there is no generation loss in digital transfers—a copy sounds the same as the original. Without limits on unauthorized copying, a digital audio recording format could easily encourage the pirating of master-quality recordings.

One solution is to amend an associated digital "tag" with each audio file that identified the copyright holder. To implement such a plan, all devices capable of such digital reproduction must faithfully reproduce the amended, associated tag.

With the passage of the Audio Home Recording Act of 1992, inclusion of serial copying technology became law in the United States. This legislation mandated the inclusion of serial copying technology, such as SCMS (Serial Copy Management System), in consumer digital recorders. SCMS recognizes a "copyright flag" encoded on a prerecorded original (such as a CD), and writes that flag into the subcode of digital copies (such as a transfer from a CD to a DAT tape). The presence of the flag prevents an SCMS-equipped recorder from digitally copying the copy, thus breaking the chain of perfect digital cloning.

However, subsequent developments—both technical and legal—have demonstrated the limited benefits of this legislation. While digital-secure-music-delivery systems (such as SCMS) are designed to support the rights of content owners in the digital domain, the problem of analog copying requires a different approach. In the digital domain, information about the copy status of a given piece of music may be carried in the subcode, which is separate information that travels along with the audio data. In the analog domain, there is no subcode—the only place to put the extra information is to hide it within the audio signal itself.

Digital Watermarks

Techniques for identifying copyright information of digital audio content that address both analog and digital copying instances have received a great deal of attention in both the industrial community and the academic environment. One of the most promising "digital labeling" techniques is amalgamation of a digital watermark into the audio signal itself by altering the signal's frequency spectrum such that the perceptual characteristics of the original recording are preserved. In other words, a watermark is clandestinely integrated with an audio clip so that when copied, the watermark will be reproduced along with the clip itself.

In general, a "digital watermark" is a pattern of bits inserted into a digital representation (i.e., signal or file) of content (i.e., an image, audio, video, or the like) that identifies the content's copyright information (e.g., author, rights, etc.). The name comes from the faintly visible watermarks imprinted on stationery that identify the manufacturer of the stationery. The purpose of digital watermarks is to provide copyright protection for intellectual property that is in digital format.

Unlike printed watermarks, which are intended to be somewhat visible, digital watermarks are designed to be completely invisible, or in the case of audio clips, inaudible. That is invisible to all except a specifically designed watermark detector. Moreover, the actual bits representing the watermark are typically scattered throughout the file in such a way that they cannot be identified and manipulated. Finally, the digital watermark should be robust enough so that it can withstand normal changes to the file, such as reductions from lossy compression algorithms.

Satisfying all these requirements is no easy feat, but there are several competing technologies. All of them work by making the watermark appear as noise—that is, random data that exists in most digital files anyway. To view a watermark, you need a special program or device (i.e., a "detector") that knows how to extract the watermark data.

Herein, such a digital watermark may be simply called a "watermark." Generically, it may be called an "information pattern of discrete values" or a "data pattern of discrete values." The audio signal (or clip) in which a watermark is encoded is effectively "noise" in relation to the watermark.

Watermarking

Watermarking gives content owners a way to self-identify each track of music, thus providing proof of ownership and a way to track public performances of music for purposes of royalty distribution. It may also convey instructions, which can be used by a recording or playback device, to determine whether and how the music may be distributed. Because that data can be read even after the music has been converted from digital to an analog signal, watermarking can be a powerful tool to defeat analog circumvention of copy protection.

The general concept of watermarking has been around for at least 30 years. It was used by companies (such as Muzak™) to audibly identify music delivered through their systems. Today, however, the emphasis in watermarking is on inaudible approaches. By varying signals embedded in analog audio programs, it is possible to create patterns that may be recognized by consumer electronics devices or audio circuitry in computers.

For general use in the record industry today, watermarking must be completely inaudible under all conditions. This guarantees the artistic integrity of the music. Moreover, it must be robust enough to survive all forms of attacks. To be effective, watermarks must endure processing, format conversion, and encode/detect cycles that today's music may encounter in a distribution environment that includes radio, the Web, music cassettes, and other non-linear media. In addition, it must endure malevolent attacks by digital pirates.

Watermark Encoding

Typically, existing techniques for encoding a watermark within discrete audio signals facilitate the insensitivity of the human auditory system (HAS) to certain audio phenomena. It has been demonstrated that, in the temporal domain, the HAS is insensitive to small signal level changes and peaks in the pre-echo and the decaying echo spectrum.

The techniques developed to facilitate the first phenomenon are typically not resilient to de-synch attacks. Due to the difficulty of the echo cancellation problem, techniques that employ multiple decaying echoes to place a peak in the signal's cepstrum can hardly be attacked in real-time, but fairly easy using an off-line exhaustive search. (The term "cepstrum" is the accepted terminology for the Fourier transform of the logarithm of the power spectrum of a signal.)

Watermarking techniques that embed secret data in the frequency domain of a signal facilitate the insensitivity of the HAS to small magnitude and phase changes. In both cases, a publisher's secret key is encoded as a pseudo-random sequence that is used to guide the modification of each magnitude or phase component of the frequency domain. The modifications are performed either directly or shaped according to the signal's envelope.

In addition, watermarking schemes have been developed which facilitate the advantages but also suffers from the disadvantages of hiding data in both the time and frequency domain. It has not been demonstrated whether spread-spectrum watermarking schemes would survive combinations of common attacks: de-synchronization in both the temporal and frequency domain and mosaic-like attacks.

Watermark Detection

The watermark detection process is performed by synchronously correlating the suspected audio clip with the watermark of the content publisher. A common pitfall for all watermarking systems that facilitate this type of data hiding is intolerance to desynchronization attacks (e.g., sample cropping, insertion, repetition, variable pitch-scale and time-scale modifications, audio restoration, and arbitrary combinations of these attacks) and deficiency of adequate techniques to address this problem during the detection process.

Furthermore, it is desirable to have a highly accurate, quick, and efficient watermark detection system. When detecting a watermark, the content of the clip (e.g., music) is merely noise in relation to the watermark. Therefore, this "noise" hinders with such accurate, quick, and efficient watermark detection. However, of course, the watermark's purpose is to protect this "noise."

Moreover, the mere act of accurately detecting a watermark in a signal may aid a digital pirate in empirically ascertaining the watermark. Conventionally, this risk is considered small and too difficult to address; therefore, the industry lives with this risk.

Desiderata of Watermarking Technology

Watermarking technology has several highly desirable goals (i.e., desiderata) to facilitate protection of copyrights of audio content publishers. Below are listed several of such goals.

Perceptual Invisibility. The embedded information should not induce audible changes in the audio quality of the resulting watermarked signal. The test of perceptual invisibility is often called the "golden ears" test.

Statistical Invisibility. The embedded information should be quantitatively imperceptive for any exhaustive, heuristic, or probabilistic attempt to detect or remove the watermark. The complexity of successfully launching such attacks should be well beyond the computation power of publicly available computer systems.

Tamperproofness. An attempt to remove the watermark should damage the value of the music well above the hearing threshold.

Cost. The system should be inexpensive to license and implement on both programmable and application-specific platforms.

Non-disclosure of the Original. The watermarking and detection protocols should be such that the process of proving audio content copyright both in-situ and in-court, does not involve usage of the original recording.

Enforceability and Flexibility. The watermarking technique should provide strong and undeniable copyright proof. Similarly, it should enable a spectrum of protection levels, which correspond to variable audio presentation and compression standards.

Resilience to Common Attacks. Public availability of powerful digital sound editing tools imposes that the watermarking and detection process is resilient to attacks spawned from such consoles. The standard set of plausible attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3,
adaptive transform coding (ATRAC),
adaptive subband coding,
Digital Audio Broadcasting (DAB),
Dolby AC2 and AC3 systems,
applying additive or multiplicative noise,
applying a second Embedded Signal, using the same system, to a single program fragment,
frequency response distortion corresponding to normal analogue frequency response controls such as bass, mid and treble controls, with maximum variation of 15 dB with respect to the original signal, and
applying frequency notches with possible frequency hopping.

Watermark Circumvention

If the encoding of a watermark can thwart a malicious attack, then it can avoid the harm of the introduction of unintentional noise. Therefore, any advancement in watermark technology that makes it more difficult for a malevolent attacker to assail the watermark also makes it more difficult for a watermark to be altered unintentionally.

In general, there are two common classes of malevolent attacks:

1. De-synchronization of watermark in digital audio signals. These attacks alter audio signals in such a way to make it difficult for the detector to identify the location of the encoded watermark codes.
2. Removing or altering the watermark. The attacker discovers the location of the watermark and intentionally alters the audio clip to remove or deteriorate a part of the watermark or its entirety.

Framework to Thwart Attacks

Accordingly, there is a need for a framework of protocols for hiding watermarks in digital audio signals that are effective against malevolent attacks. The framework should also be flexible to enable a spectrum of protection levels, which correspond to variable audio presentation and compression standards, and yet resilient to common attacks spawned by powerful digital sound editing tools.

However, such a framework should support quick, efficient, and accurate detection of watermarks by a specifically designed watermark detector. Moreover, it is desirable for such a framework to minimize false indications of a watermark's presence or absence. Furthermore, it is best if the act of detection does not provide decipherable clues to a digital pirate as to the value or location of the embedded watermark.

SUMMARY

Described herein is an audio watermarking technology for detecting watermarks in audio signals, such as a music clip. The watermark identifies the content producer, providing a signature that is embedded in the audio signal and cannot be removed. The watermark is designed to survive all typical kinds of processing and all types of malicious attacks that attempt to remove or modify the watermark from the signal. The implementations of the watermark detecting system, described herein, support quick, efficient, and accurate detection of watermarks by the specifically designed watermark detecting system.

In one described implementation, a watermark detecting system employs a cardinality-scaled correlation (CSC) test to determine the presence of a watermark using less expensive materials (hardware), quicker calculations, and a more accurate test (than the original correlation test).

In other described implementations, a watermark detecting system employs a cepstrum filter and dynamic processing to minimize the affect of the "noise" in the watermarked signal. The "noise" is the original content of the signal before such signal was watermarked.

In still another described implementation, a watermark detecting system employs a mechanism for random detection threshold so that the act of watermark detection does not provide decipherable clues to a digital pirate as to the value or location of the embedded watermark.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

FIGS. 2A–4E show graphs of an audio clip to illustrate blocking and framing of such audio clip.

FIG. 3 is a block diagram of a watermarking detecting unit implemented, for example, at the client.

FIG. 4 is a flow diagram showing a methodological implementation of watermark detecting.

DETAILED DESCRIPTION

The following description sets forth specific embodiments of the improved audio watermark detector that incorporate elements recited in the appended claims. These embodiments are described with specificity in order to meet statutory written description, enablement, and best-mode requirements. However, the description itself is not intended to limit the scope of this patent. Rather, the inventors have contemplated that the claimed improved audio watermark detector might also be embodied in other ways, in conjunction with other present or future technologies.

Incorporation by Reference

The following provisional application is incorporated by reference herein: U.S. Provisional Patent Application Ser. No. 60/143432 entitled "Improved Audio Watermarking" filed on Jul. 13, 1999 (herein, "Improved Watermarking 1999").

In addition, the following co-pending patent applications (which are all assigned to the Microsoft Corporation) are incorporated by reference herein:

U.S. patent application Ser. No. 09/316,899, entitled "Audio Watermarking with Dual Watermarks" filed on May 22, 1999, (herein, "Dual Watermarking 1999");

U.S. patent application Ser. No. 09/614,660, entitled "Improved Stealthy Audio Watermarking" filed on Jul. 12, 2000 (herein, "Stealthy Watermarking 2000"); and U.S. patent application Ser. No. 09/614,890, entitled "Improved Audio Watermarking with Covert Channel and Permutations" filed on Jul. 12, 2000 (herein, "Improved Watermarking 2000").

Moreover, the following U.S. Patents (which are all assigned to the Microsoft Corporation) are incorporated by reference herein:

U.S. Pat. No. 6,487,574, entitled "A system and Method for Producing Modulated Comples Lapped Transforms" issued on Nov. 26, 2002 (herein, "MCLT 1999");

U.S. Pat. No. 6,029,126, entitled "Scalable Audio Coder and Decoder" issued on Feb. 22, 2000 (herein, "CoDec 2000").

Introduction

Described herein are exemplary implementations of the improved audio watermark detector (i.e., "exemplary watermark detector").

Figure 1:
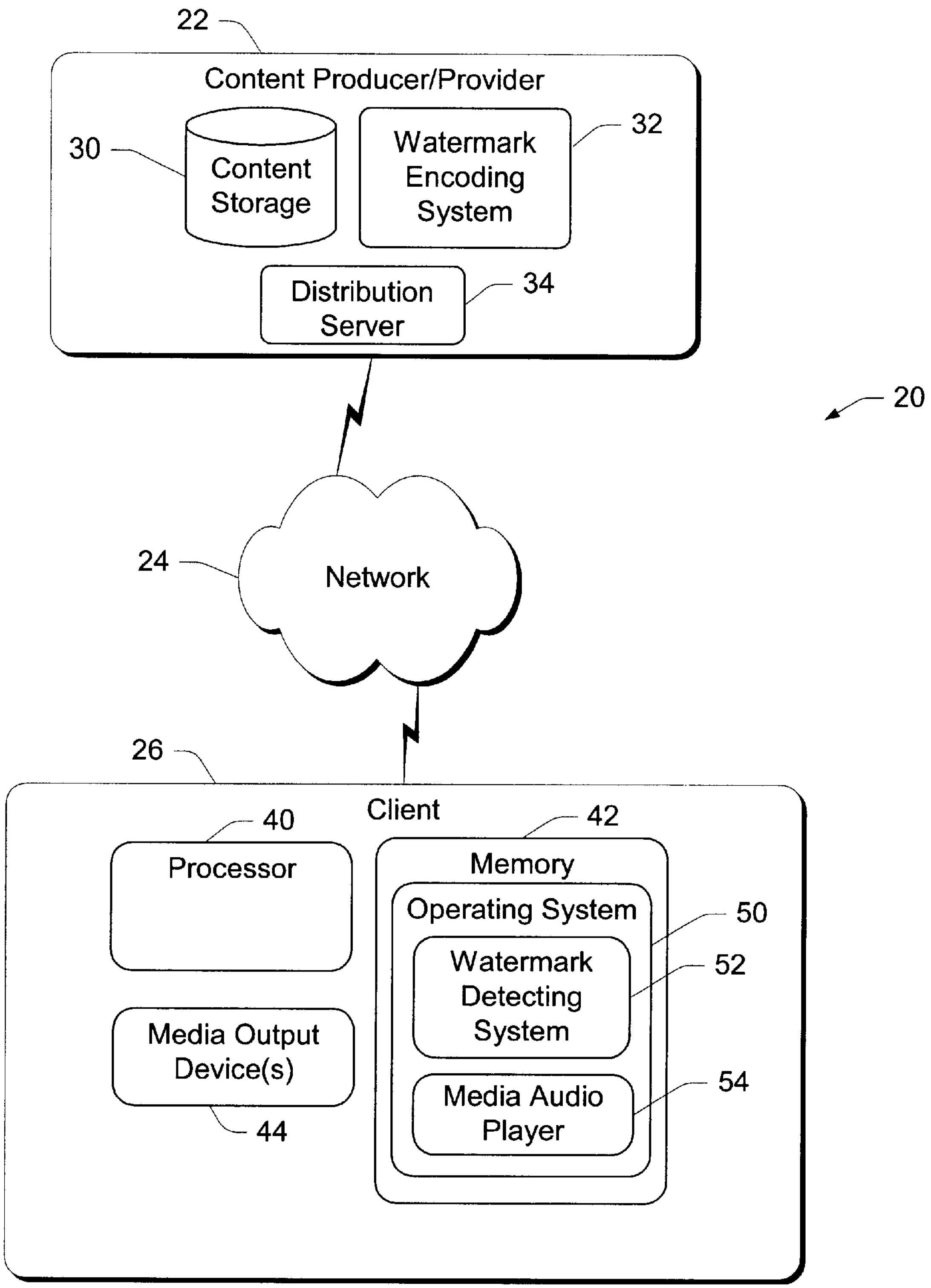
FIG. 1 is a block diagram of an audio production and distribution system in which a content producer/provider watermarks audio signals and subsequently distributes that watermarked audio stream to a client over a network.
Figure 8:
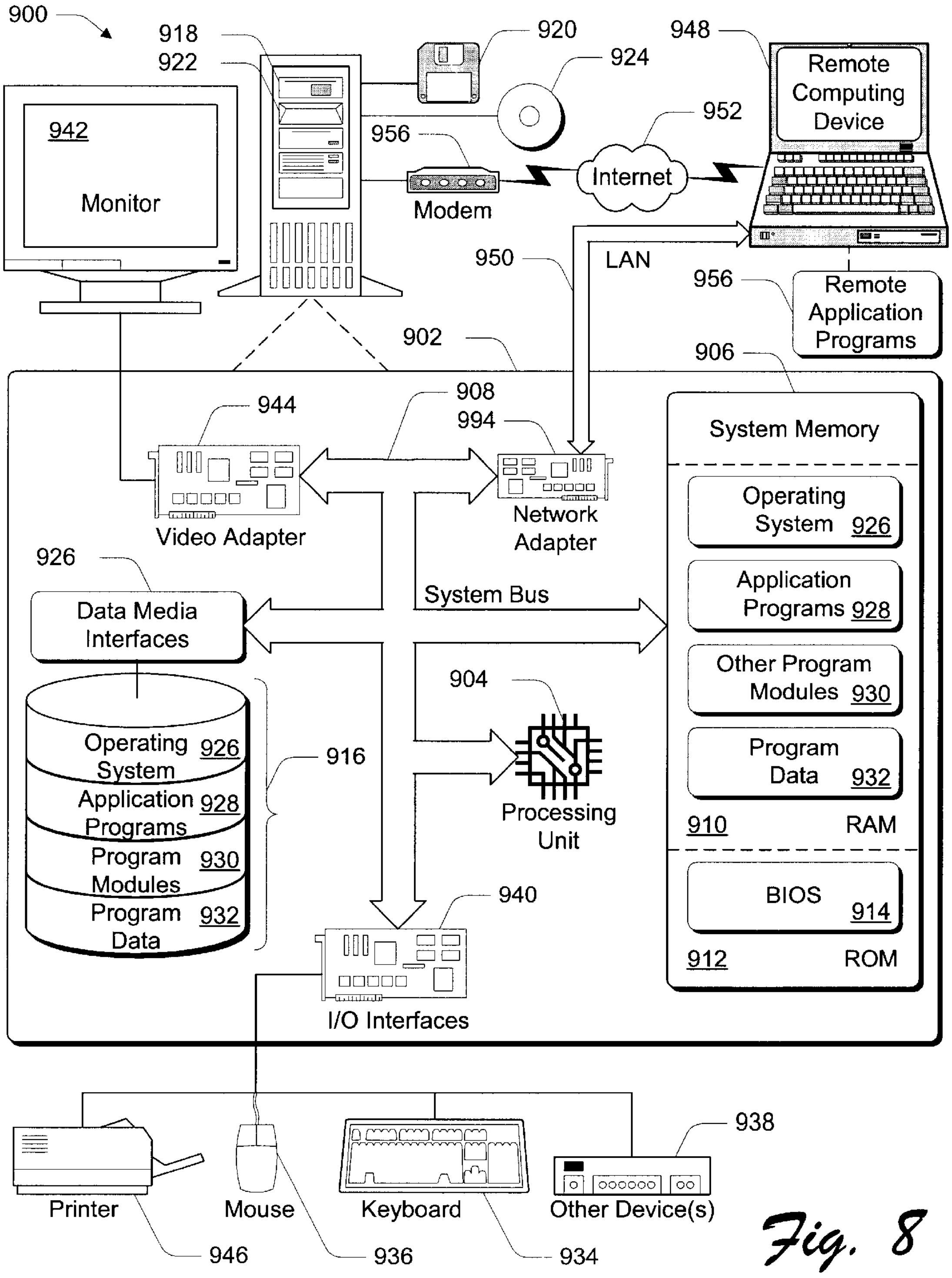
FIG. 8 is an example of a computing operating environment capable of implementing the improved audio watermark detector.

The exemplary watermark detector implementations, described herein, may be implemented by an audio production and distribution system like that shown in FIG. 1 and by a computing environment like that shown in FIG. 8.

A watermark may be generically called an "information pattern of multiple discrete values" and/or a "data pattern of multiple discrete values" because it is a pattern of binary bits designed to convey information and/or data. It may also be referred to simply as a "data pattern." A watermark is encoded in a digital audio signal (or clip, file, or the like). In relation to the watermark, the audio signal is effectively "noise." In general, watermarking involves hiding the information of the watermark within the "noise" of a digital signal.

Audio Production and Distribution System Employing Watermarks

FIG. 1 shows an audio production and distribution system 20 having a content producer/provider 22 that produces original musical content and distributes the musical content over a network 24 to a client 26. The content producer/provider 22 has a content storage 30 to store digital audio streams of original musical content. The content producer 22 has a watermark encoding system 32 to sign the audio data stream with a watermark that uniquely identifies the content as original. The watermark encoding system 32 may be implemented as a standalone process or incorporated into other applications or an operating system.

A watermark is an array of bits generated using a cryptographically secure pseudo-random bit generator and a new error correction encoder. The pseudo-uniqueness of each watermark is provided by initiating the bit generator with a key unique to each audio content publisher. The watermark is embedded into a digital audio signal by altering its frequency magnitudes such that the perceptual audio characteristics of the original recording are preserved. Each magnitude in the frequency spectrum is altered according to the appropriate bit in the watermark.

The watermark encoding system 32 applies the watermark to an audio signal from the content storage 30. Typically, the watermark identifies the content producer 22, providing a signature that is embedded in the audio signal and cannot be removed. The watermark is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing.

The content producer/provider 22 has a distribution server 34 that streams the watermarked audio content over the network 24 (e.g., the Internet). An audio stream with a watermark embedded therein represents to a recipient that the stream is being distributed in accordance with the copyright authority of the content producer/provider 22. The server 34 may further compress and/or encrypt the content conventional compression and encryption techniques prior to distributing the content over the network 24.

The client 26 is equipped with a processor 40, a memory 42, and one or more media output devices 44. The processor 40 runs various tools to process the audio stream, such as tools to decompress the stream, decrypt the date, filter the content, and/or apply audio controls (tone, volume, etc.). The memory 42 stores an operating system 50 (such as a Microsoft® Windows 2000® operating system), which executes on the processor. The client 26 may be embodied in a many different ways, including a computer, a handheld entertainment device, a set-top box, a television, an audio appliance, and so forth.

The operating system 50 implements a client-side watermark detecting system 52 to detect watermarks in the audio stream and a media audio player 54 to facilitate play of the audio content through the media output device(s) 44 (e.g., sound card, speakers, etc.). If the watermark is present, the client can identify its copyright and other associated information.

The operating system 50 and/or processor 40 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity.

Watermark Insertion

For an implementation of the exemplary watermark detector to detect a watermark in a signal, the watermark must first be inserted into the signal. Examples of a watermark encoding system compatible with the exemplary watermark detector are described in "Improved Watermarking 1999"; "Dual Watermarking 1999"; "MCLT 1999"; "Stealthy Watermarking 2000"; and "Improved Watermarking 2000," which, as indicated above, are incorporated by reference.

Blocks and Frames

During the encoding, the original audio signal is processed into equally sized, overlapping, time-domain blocks. Each of these blocks is the same length of time. For example, one second, two seconds, 50 milliseconds, and the like. In addition, these blocks overlap equally so that half of each block (except the first and last) is duplicated in an adjacent block.

Figures 2A, 2B, 2C, 2D:
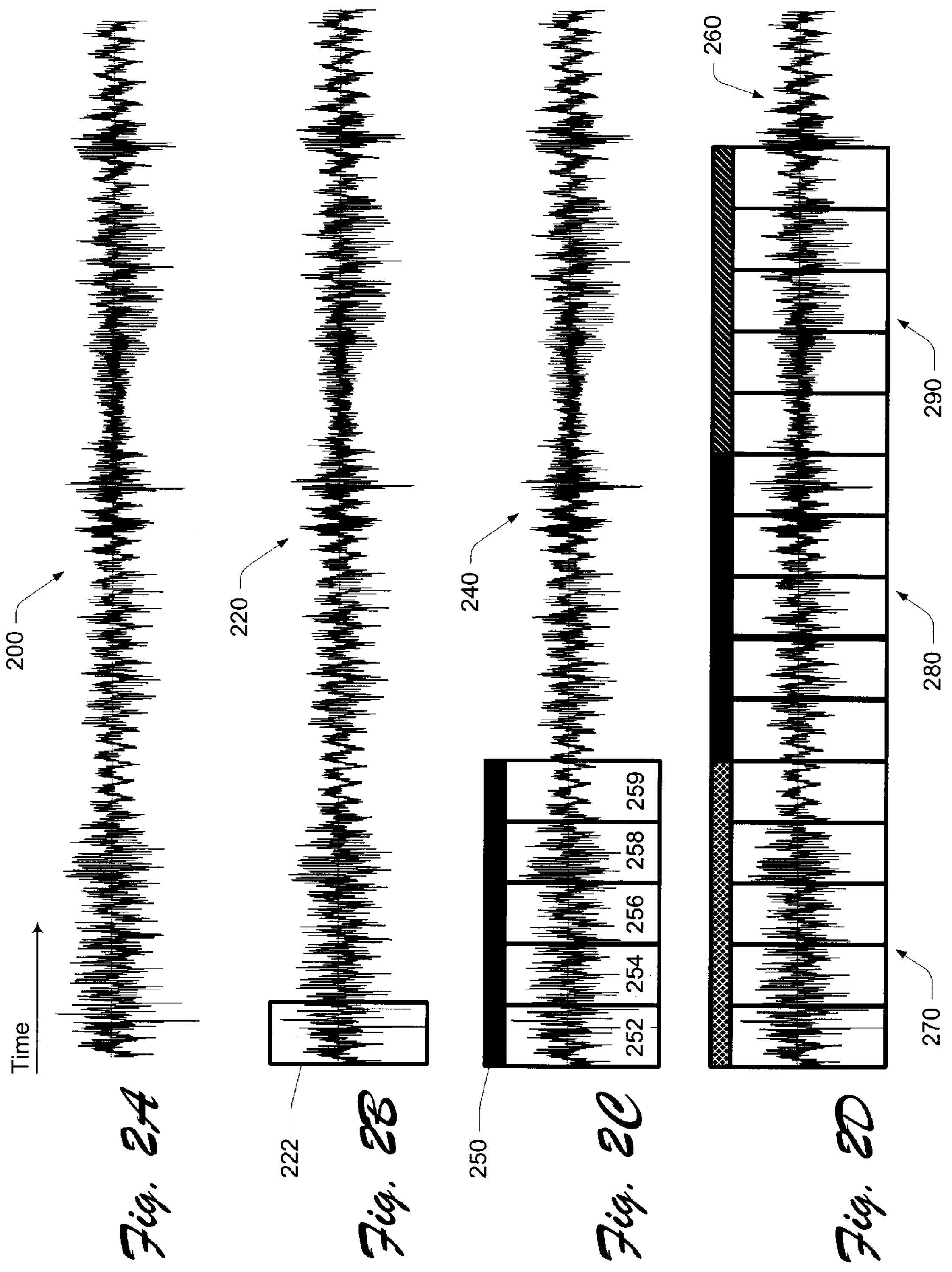

FIG. 2A shows a graph 200 of an audio signal in the time domain. Time advances from left to right. FIG. 2B shows a graph 220 of the same audio signal sampled over the same time period. FIG. 2B includes a block 222 representing a first of equally spaced, overlapping, time-domain blocks.

Each block is transformed by a MCLT (modulated complex lapped transform) to the frequency domain. This produces a vector having a defined number of magnitude and phase components. The magnitude is measured in a logarithmic scale, in decibels (dB).

FIG. 2C shows a graph 240 of the same audio signal sampled over the same time period. In FIG. 2C, there is a set 250 of five adjacent blocks 252–259. The blocks represent equally spaced, overlapping, time-domain blocks. (For simplicity, the overlapping nature of the blocks is not shown.) The set 150 is called a "frame." A frame may include any given number of blocks.

FIG. 2D shows a graph 260 of the same audio signal sampled over the same time period. In FIG. 2D, there are three frames 270, 280, and 290. Each frame has five adjacent blocks. The blocks represent equally spaced, overlapping, time-domain blocks. (For simplicity, the overlapping nature of the blocks is not shown.)

Encoding Bits of a Watermark

A watermark is composed of a given number of bits (such as eighty bits). The bits of a watermark are encoded by slightly increasing and decreasing the magnitude of frequencies within a block. This slight change is plus or minus Q decibel (dB), where Q, for example, is set to one. These frequency changes are not heard because they are too small.

Watermark Detection

In general, a watermark detecting system is used to determine whether a subject audio signal has a watermark encoded therein. This detection should be quick, efficient, and accurate.

In the description of the exemplary watermark detector, the following variable and symbols are used:

x(n)—original audio signal (without any watermark);

y'(n)—watermarked audio signal before noise-reduction;

y(n)—watermarked audio signal after noise-reduction;

M—number of samples;

Y(k)—a MCLT (see "MCLT 1999") transform of y(n) to the frequency domain;

$Y_{MAG}(K)$—frequency magnitude;

φ(k)—phase;

w(k)—watermark vector;

K—key;

Z(k)—mask threshold vector; and

Q—is the amount with which signal x is modified by watermark vector w to get watermarked signal y; Q is typically plus or minus one decibel (dB).

Figure 3:
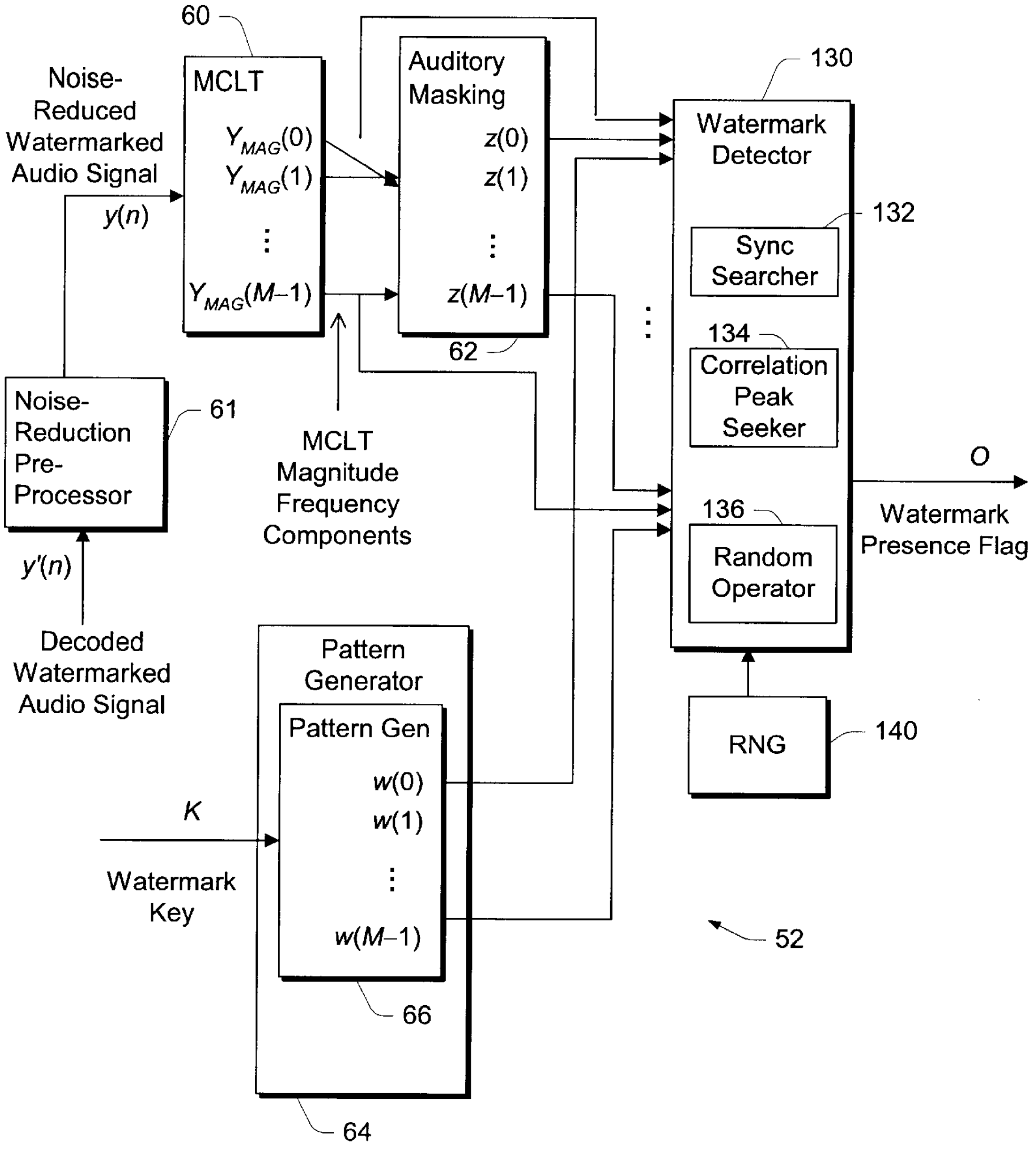

FIG. 3 shows one implementation of the watermark detecting system 52 that executes on the client 26 to detect whether the content includes watermarks. To detect the watermarks, the system finds whether the corresponding patterns {w(k)} is present in the signal.

A watermark detecting system 52 has an MCLT component 60, a noise-reduction pre-processor 61, an auditory masking model 62, and a pattern generator 64. The noise-reduction pre-processor 61 receives a decoded audio signal y'(n) and reduces the "noise". For more details, see the section below titled Noise Reduction. The MCLT component 60 receives a noise-reduced audio signal y(n) from the noise-reduction pre-processor 61.

This MCLT component 60 transforms the signal to the frequency domain, producing the vector Y(k) having a magnitude component $Y_{MAG}(k)$ and phase component φ(k). The auditory masking model 62 computes a set of hearing thresholds z(k) (k=0, 1, . . . , M-1) based on the magnitude components $Y_{MAG}(k)$. A pattern generator 64 creates watermark vector w(k).

Unlike the encoder system 32, the watermarking detecting system 52 has a watermark detector 130 that processes all available blocks of the watermarked signal $\{Y_{MAG}(k)\}$, the hearing thresholds {z(k)}, and the watermark pattern {w(k)}. The watermark detector 130 has a synchronization searcher 132, a correlation peak seeker 134, and a random operator 136. The detecting system 52 also has a random number generator (RNG) 140 that provides a pseudo-random variable ε to the watermark detector 130 to thwart a detection-comparison attack (which is discussed below in the Fuzzy Detection Threshold section).

Let y be a vector formed by all coefficients {Y(k)}. Furthermore, let x, z, and w be vectors formed by all coefficients {X(k)}, {z(k)}, and {w(k)}, respectively. All values are in decibels (i.e., in a log scale). Furthermore, let y(i) be the $i_{th}$ element of a vector y. The index i varies from 0 to K-1, where K=TM.

Watermark insertion is given by, $$y=x+w, \text{ or } y(i)=x(i)+w(i),\ i=0, 1, \ldots, K\text{-}1 \tag{1}$$

where the actual vector w may have some of its elements set to zero, depending on the values of the hearing threshold vector z. Note that strictly speaking the sum in Equation (1) is not a linear superposition, because the values w(i) are modified based on v(i), which in turn depends on the signal components x(i).

Now, consider a normalized correlation test operator NC defined as follows:

$$NC \equiv \frac{\sum_{i=0}^{K-1} y(i)w(i)}{\sum_{i=0}^{K-1} w^2(i)} \tag{2}$$

In the case where the signal is not watermarked, y(i)=x(i), the normalized correlation measure is equal to:

$$NC_0 \equiv \frac{\sum_{i=0}^{K-1} x(i)w(i)}{\sum_{i=0}^{K-1} w^2(i)} \tag{3}$$

Since the watermark values w(i) have zero mean, the numerator in Equation (3) will be a sum of negative and positive values, whereas the denominator will be equal to $Q^2$ times the number of indices in the set I. Therefore, for a large K, the measure $NC_0$ will be a random variable with an approximately normal (Gaussian) probability distribution, with an expected value of zero and a variance much smaller than one.

In the case where the signal is watermarked, y(i)=x(i)+w(i), the normalized correlation measure is equal to:

$$NC_1 \equiv \frac{\sum_{i=0}^{K-1} y(i)w(i)}{\sum_{i=0}^{K-1} w^2(i)} = \frac{\sum_{i=0}^{K-1} [x(i)+w(i)]w(i)}{\sum_{i=0}^{K-1} w^2(i)} = NC_0 + 1 \tag{4}$$

As seen in Equation (4), if the watermark is present, the normalized correlation measure will be close to one. More precisely, $NC_1$ will be a random variable with an approximately normal probability distribution, with an expected value of one and a variance much smaller than one.

The correlation peak seeker 134 in the watermark detector 130 determines the normalized correlation operator NC. From the value of the normalized correlation operator NC, the watermark detector 130 decides whether a watermark is present or absent. In its most basic form, the watermark presence decision compares the normalized correlation operator NC to a detection threshold "Th", forming the following simple rule:

If NC≦Th, the watermark is not present; otherwise,

If NC>Th, the watermark is present.

The detection threshold "Th" is a parameter that controls the probabilities of the two kinds of errors:

1. False alarm: the watermark is not present, but is detected as being present.
2. Miss: the watermark is present, but is detected as being absent.

If Th=½, the probability of a false alarm "Prob(false alarm)" equals the probability of a miss "Prob(miss)". However, in practice, it is typically more desirable that the detection mechanism error on the side of never missing detection of a watermark, even if in some cases one is falsely detected. This means that Prob(miss)<<Prob(false alarm) and hence, the detection threshold is set to Th<½. In some applications, false alarms may have a higher cost. For those, the detection threshold is set to Th>½.

Cardinality-Scaled Correlation (CSC) Test for Watermark Detection

The above-provided variations (Equations 2–4) of the normalized correlation (NC) formula produce reliable results only if (i) the watermark sequence is long and (ii) the audio signal and the watermark are mutually independent (i.e. if asymptotically the normalized correlation test NC of the original signal and the watermark sequence yields NC=0).

However, for short audio clips, which represent the main target of typical audio watermarking schemes, it is hard to enable such independence. Therefore, better watermark detection can be performed if a variance-scaled correlation (VSC) test is used instead of the normalized correlation test. The VSC test takes into account the mutual dependence between the audio clip and the watermark. The VSC test is defined as:

$$VSC = \frac{\sum_{t=0}^{K-1}(y(t)-\tilde{y})\cdot(w(t)-\tilde{w})}{\mathrm{var}(y(t))\cdot\mathrm{var}(w(t))\cdot\sum_{t=0}^{K-1}w^2(t)}$$

$$VSC = \frac{\sum_{t=0}^{K-1}(y(t)-\tilde{y})\cdot(w(t)-\tilde{w})}{\sqrt{\mathrm{var}(y(t))\cdot\mathrm{var}(w(t))\cdot\sum_{t=0}^{K-1}w^2(t)}}$$

or alternatively $$VSC = \frac{\sum_{t=0}^{K-1}(y(t)-\tilde{y})\cdot(w(t)-\tilde{w})}{\mathrm{std}(y(t))\cdot\mathrm{std}(w(t))\cdot\sum_{t=0}^{K-1}w^2(t)}$$

where $\tilde{y}$ and $\tilde{w}$ are arithmetic means of signals y(t) and w(t) respectively and var( ) computes the variance of a signal. Also, where std( ) computes the standard deviation if a signal. The result of the test may be called the "VSC value."

Performing the VSC test may be computationally expensive because signal variance has to be computed. Fortunately, another choice exists in the form of the exemplary watermark detector with an cardinality-scaled correlation (CSC) test.

Consider the exemplary watermark detector with the cardinality-scaled correlation (CSC) test as follows:

$$\mathrm{CSC} = \frac{\mathrm{sum}(y \mid w=1)}{\mathrm{card}(w=1)} - \frac{\mathrm{sum}(y \mid w=0)}{\mathrm{card}(w=0)} \qquad (5)$$

where "card" indicates cardinality, which is the number of elements in a set. Using this test, the sum (y¦w=0) of signal samples for which the corresponding watermark bit w is zero divided by the cardinality of zeros in the watermark is subtracted from the sum (y¦w=1) of signal samples for which the corresponding watermark bit w is one divided by the cardinality of ones in the watermark.

The results of this cardinality-scaled correlation (CSC) test may be called the "CSC value. "

Just like the original normalized correlation test (Equation 2–4), the result is compared to a threshold "Th" using this simple rule:

If CSC value ≦Th, the watermark is not present; otherwise,

If CSC value >Th, the watermark is present.

This CSC test (of Equation 5) is less computationally expensive than the VSC test because it does not require the computation of the variance of the audio signal. Since the CSC test iteratively counts and sums, and divides and subtracts only twice per test, it may be easily and inexpensively implemented in both software and/or hardware. Therefore, the results are calculated much faster than the VSC test.

Moreover, it has be empirically determined that the CSC test is more accurate than the VSC test. It produces less "false alarms" and less "misses" than the VSC test. The enhanced detection stems from the fact that the CSC test is virtually insensitive to any discrepancy in the number of zeros and ones in the watermark sequence.

Fuzzy Detection Threshold

Digital pirate may malevolently attack a watermarked audio signal using the authorized watermark detection equipment. By performing a painstaking and time-consuming series of detections after slightly altering the signal, the pirate may decipher the watermark—thereby, enabling the pirate with the information to modify or remove the watermark. This attack may be called a detection-comparison attack.

However, such an attack may be thwarted by introducing an element of randomness into the detection process so that conditions for detections vary slightly. This makes the detection fuzzy and comparisons between detections valueless because each comparison is different.

This may be accomplished by adjusting the watermark-pretense decision rule. The decision rule may be slightly modified to account for a small random variance "ε" generated by the random number generator 140 (FIG. 3). The modified rule is as follows:

If CSC value +ε<Th, the watermark is not present.

If CSC value +ε>Th, the watermark is present.

The random threshold correction ε is a random variable with a zero mean and a small variance (typically around 0.1 or less). It is preferably truly random (e.g., generated by reading noise values on a physical device, such as a zener diode).

The slightly randomized decision rule protects the system against attacks that modify the watermarked signal until the detector starts to fail. Such attacks could potentially learn the watermark pattern w(i) one element at a time, even if at a high computational cost. By adding the noise ε to the value, such attacks are prevented from working.

Figure 4:
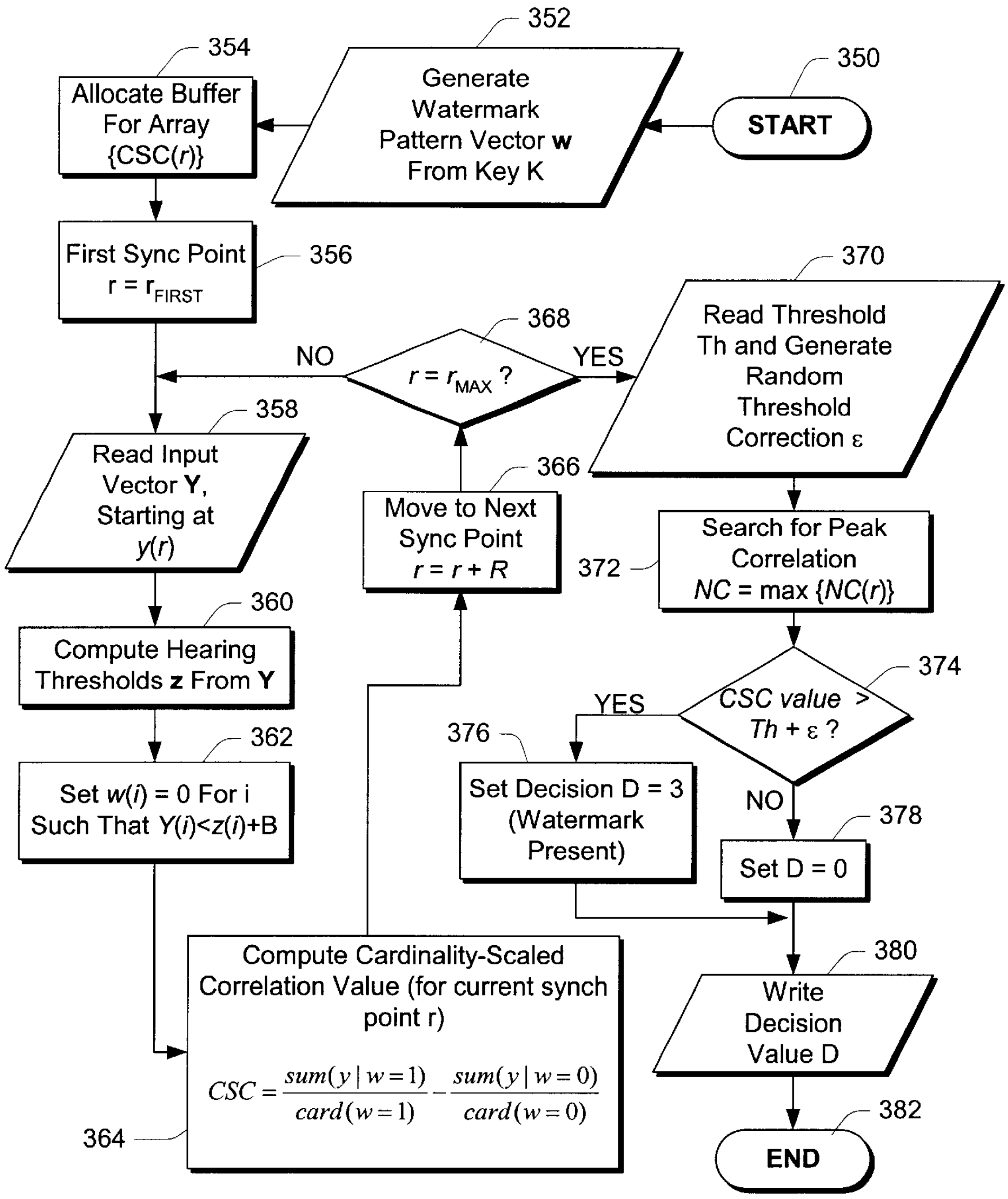

Methodological Implementation of Exemplary Watermark Detection with Cardinality-scaled correlation (CSC) and Fuzzy Detection Threshold FIG. 4 shows a methodological implementation of the exemplary watermark detection with cardinality-scaled correlation (CSC) and fuzzy detection threshold performed by the watermark detector 130. This methodological implementation may be performed in software, hardware, or a combination thereof.

At the start of the process, the watermark pattern generator 64 generates a watermark vector {w(i)} using the key K (steps 350 and 352). The detecting system 52 allocates buffer for an array of cardinality-scaled correlation (CSC) values {cSC(r)} that will be computed (step 354) and initializes the sync point r to a first sample (step 356).

At step 358, the MCLT module 60 reads in the noise-reduced audio signal y(n), starting at y(r), and computes the magnitude values $Y_{MAG}(k)$ (The noise-reduction methodology is discussed below in relation to FIG. 7.) The auditory masking model 62 then computes the hearing threshold z(k) from $Y_{MAG}(k)$ (step 360). The watermark, magnitude frequency components, and hearing thresholds are passed to the watermark detector 130.

At step 362, the watermark detector 130 tests for a condition where there is no watermark by setting the watermark vector w(i) to zero, such that the watermarked input vector Y(i) is less than the hearing threshold by buffer value B. Then, the watermark detector 130, using the CSC test of Equation 5 above, computes the cardinality-scaled correlation (CSC) value for the current sync point r (step 364). The process of computing CSC values continues for subsequent sync points, each incremented from the previous point by step R (i.e., r=r+R) (step 366), until the CSC values for a maximum number of sync points has been collected (step 368).

At step 370, the watermark detector 130 reads the detection threshold "Th" and generates the random threshold correction $\epsilon$. More particularly, the random operator 136 computes the random threshold correction $\epsilon$ based on a random output from the random number generator 140. Then, at step 372, the cardinality-scaled correlation peak seeker 134 searches for peak cardinality-scaled correlation such that:

$$CSC=\max\{CSC(r)\}$$

If the cardinality-scaled correlation value CSC+$\epsilon$>Th, the watermark is present and a decision flag D is set to one (steps 374 and 376). Otherwise, the watermark is not present and the decision flag D is reset to zero (step 378). The watermark detector 130 writes the decision value D and the process concludes (steps 380 and 382).

After the decision, values have been computed for the watermark, the watermark detector 130 outputs a flag. A watermark presence flag O indicates whether the watermark is present.

Noise Reduction

For example and for this discussion, assume that the original content of the audio clip is music. One person's trash is another person's treasure. The same is true about music. Music to one, may be noise to another. It is a matter of perspective and purpose.

From the perspective of a listener, an embedded watermark is noise in relation to the music. Although the watermark "noise" is likely to be inaudible and thus, less detectible, it is noise nevertheless.

Conversely, from the perspective of a watermark detecting system (such as 130), the music is noise in relation to the embedded watermark. The music interferes with the system's job of detecting a watermark's presence.

The magnitude of the noise (of the music) greatly exceeds the magnitude of the watermark itself. The noise to watermark ratio is easily 30–60 to one. Reducing that ratio increases the accuracy of watermark detection.

The exemplary watermark detector reduces that ratio using two techniques alone or in combination: cepstrum filtering and dynamics processing.

Cepstrum Filtering

The term "real cepstrum" is the accepted terminology for the absolute value of the inverse discrete Fourier transform of the logarithm of the frequency spectrum, i.e. absolute value of the discrete Fourier transform of the signal.

$$\text{Cepstrum}(x(t))=|IDFT(\log_{10}(|DFT(x(t))|))|$$

In the remainder of this document, when we refer to a "real cepstrum", we write "cepstrum". The term "cepstrum" was coined in a 1963 paper by Bogert, Healy and Tukey. They observed that the logarithm of the power spectrum of a signal containing an echo has an additive periodic component due to the echo, and thus the Fourier transform of the logarithm of the power spectrum should exhibit a peak at the echo delay. They called this function the cepstrum, interchanging letters ("spec"→"ceps") in the word spectrum because "in general, we find ourselves operating on the frequency side in ways customary on the time side and vice versa." (A. V. Oppenheim and R. W. Schafer, *Discrete-Time Signal Processing*, Prentice Hall, Englewood Cliffs, N.J., 1989).

Figure 5:
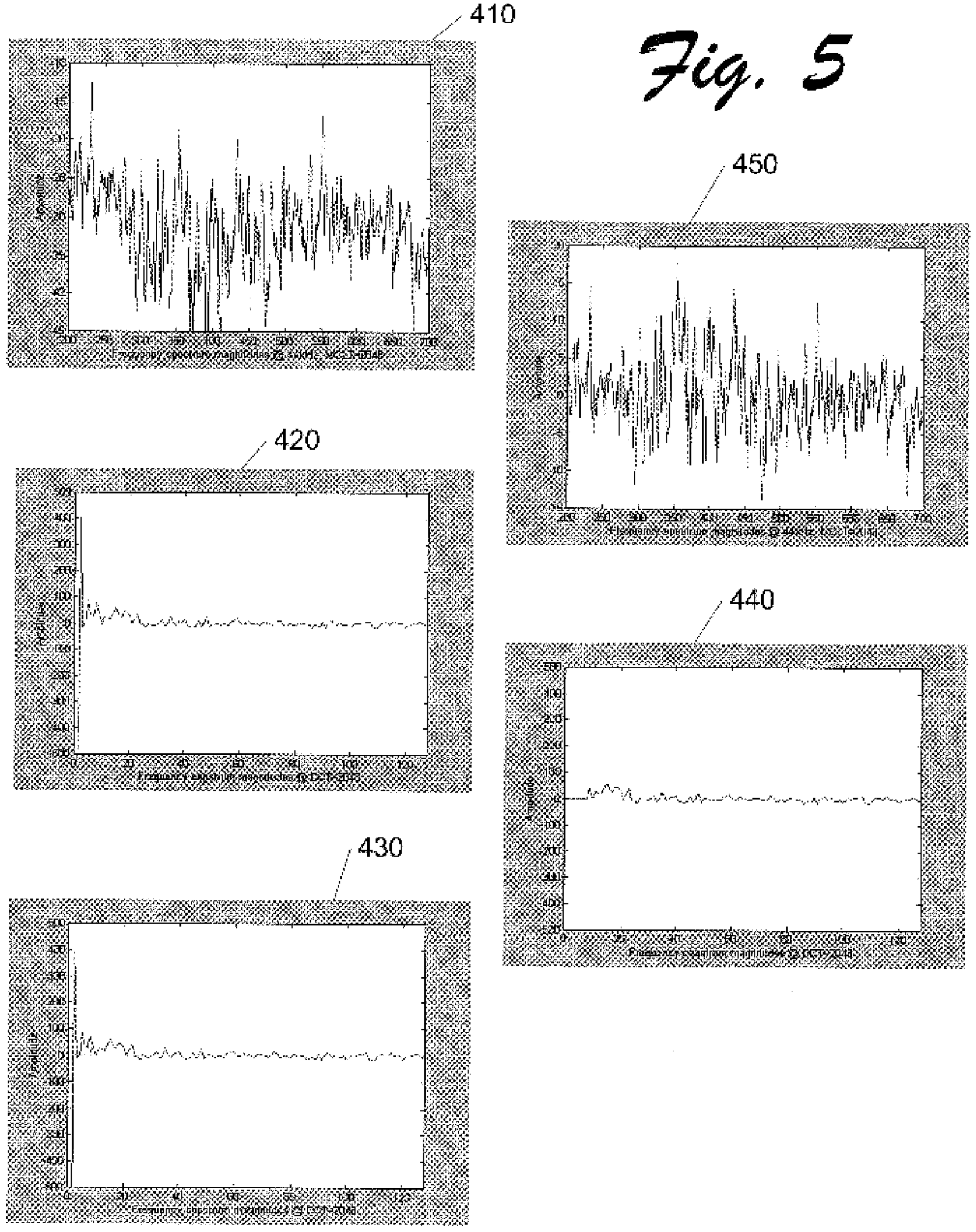
FIG. 5 includes a series of graphs illustrating an example of the affect of cepstrum filtering.

Using the exemplary watermark detector, the watermarked signal is filtered using a low-band pass cepstrum filter. The processing of the signal using this filter is illustrated in FIG. 5. Initially, the original signal is transformed into its frequency spectrum (as shown in graph 410 of FIG. 5) using a time-to-frequency transform such as the MCLT. Next, the frequency spectrum in represented in dB is translated into the cepstrum (as shown in graph 420) using a time-to-frequency transform such as the fast Fourier transform.

Then, the cepstrum is processed using a low-band pass filter, which annuls the first K coefficients of the cepstrum. The results of such processing is shown in graph 440 of FIG. 5. Typical values for K range from three to thirty. In addition to low-band pass filtering, the exemplary watermark detector can clip off the high-energy cepstrum amplitudes (typically greater than 30–200). Finally, the cepstrum-filtered frequency spectrum (as shown in graph 450) of the audio signal is recreated using a frequency-to-time transform such as the inverse fast Fourier transform.

By performing low-band pass filtering in the cepstrum, the detector removes the slow-moving, big variations (in the spectral component), but it retains the fast, small variations. The slow-moving, big variations in the spectral component of the signal include only the music of the signal. These variations do not include the watermarks. The fast, small variations include the watermark. Therefore, by performing such filtering, the detector reduces the noise (in this case actual spectrum envelope) seen from the perspective of the watermark.

Clipping off high amplitude cepstral components compresses the variations of the spectrum. This greatly reduces the standard deviation of the filtered analysis blocks (in the frequency domain) over time—thereby, reducing the overall "noise" that music (original audio clip) adds to the watermark. The watermark detector gains exceptional performance improvement using such filtering since reduced noise with respect to he watermark decreases the likelihood of a false alarm or watermark misdetection.

Empirical evidence has also shown that watermark detection is more accurate with cepstrum filtering than without.

With the exemplary watermark detector, the correlation test more robust when a signal processed by the cepstrum filtering described herein. By "more robust," it means that the results are closer to one when the watermark exists in the signal, and the results are closer to zero when it does not exist.

```
The cepstrum filtering of the exemplary watermark detector looks for
    patterns and in particular, it looks for blocks of little
    variance. These blocks represent a chunk of music, which is
    noise. When found, it removes such blocks. The following is an
    example of pseudocode that may be used to implement the
    exemplary watermark detector with cepstrum filtering: CEPSTRUM FILTERING
INPUT=BLOCK OF FREQUENCY MAGNITUDES {BLOCK}
OUTPUT=FILTERED BLOCK OF FREQUENCY MAGNITUDES {fBLOCK}
        WHICH IS USED IN THE CORRELATION (COVARIANCE) TEST
fBLOCK=CEPSTRUM_FILTERING (BLOCK) {
    CEPSTRUM = anyTIME2FREQUENCY_DOMAIN_TRANSFORM (BLOCK)
    // LOWPASS FILTERING OF THE CEPSTRUM
    for (i = 0; i < CF; i ++)
        CEPSTRUM[i] = 0;
    // PEAK REMOVAL OF THE CEPSTRUM (REDUCES SPIKES IN THE FREQ
    // SPECTRUM)
    for (i = CF; i < |CEPSTRUM|; i ++) where |CEPSTRUM| IS ITS
    CARDINALITY
        if (inout[i] > PM) inout[i] = PM;
    // PM IS ESTABLISHED EMPIRICALLY AND IN OUR TEST WE USE PM={2–50}
    RETURN (fBLOCK = anyFREQUENCY2TIME_DOMAIN_TRANSFORM (CEPSTRUM))
    }
```

Dynamics Processing

Figure 6:
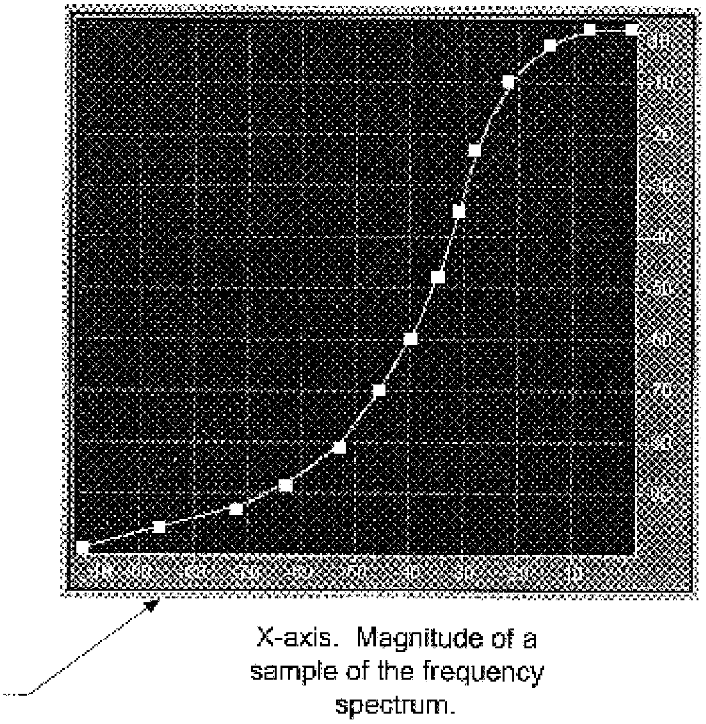
FIG. 6 is a graph illustrating an example of the affect of dynamic processing.

Dynamics processing aims at amplifying and/or attenuating each sample of the frequency spectrum proportionally to its magnitude. An example of such a non-linear amplification is illustrated in FIG. 6., , The x-coordinate of the y=DynamicsCurve(x) diagram 510 specifies the original sample magnitude in dB, while the y-coordinate specifies the translated value of the sample. In the example, magnitudes stronger than −30 dB are amplified, while magnitudes weaker than −30 dB are attenuated. Dynamics processing improves the resilience of the CSC test with respect to attacks that can be modeled as additive noise. Before applying dynamics processing, the input audio signal may be normalized to a default energy level.

The following is an example of pseudocode that may be used to implement the exemplary watermark detector with dynamic processing:

```
DYNAMICS PROCESSING
INPUT=BLOCK OF FREQUENCY MAGNITUDES {BLOCK}
OUTPUT=AMPLIFIED BLOCK OF FREQUENCY MAGNITUDES {aBLOCK}
        WHICH IS USED IN THE CORRELATION (COVARIANCE) TEST
aBLOCK=DYNAMICS_PROCESSING (BLOCK) {
    // P, a, b ARE PARAMETERS IDENTIFIED EMPIRICALLY
    P = 0.1
    a = 0.005
    b = 0.03
    ENERGY = NORMALIZED SUM OF ENERGY OF ALL FREQUENCY MAGNITUDES IN
    BLOCK
    AMPLIFY = 1
    // COMPUTE THE AMPLIFICATION FACTOR
    if (ENERGY < P) {
        ga = (P-b) / (P-a)
        gb = P* (b-a) / (P-a)
        if (ENERGY > a) {
            ec = ga * ENERGY + gb
        } else {
            ec = (b/a) * ENERGY
        }
        AMPLIFY = ec/ENERGY
    }
    For each frequency magnitude BLOCK[i] in BLOCK compute
        ABLOCK[i] = DynamicsCurve (BLOCK[i] * AMPLIFY)
    // WHERE DynamicsCurve() IS A FUNCTION DEFINED AS IN Figure 6.
}
```

Figure 7:
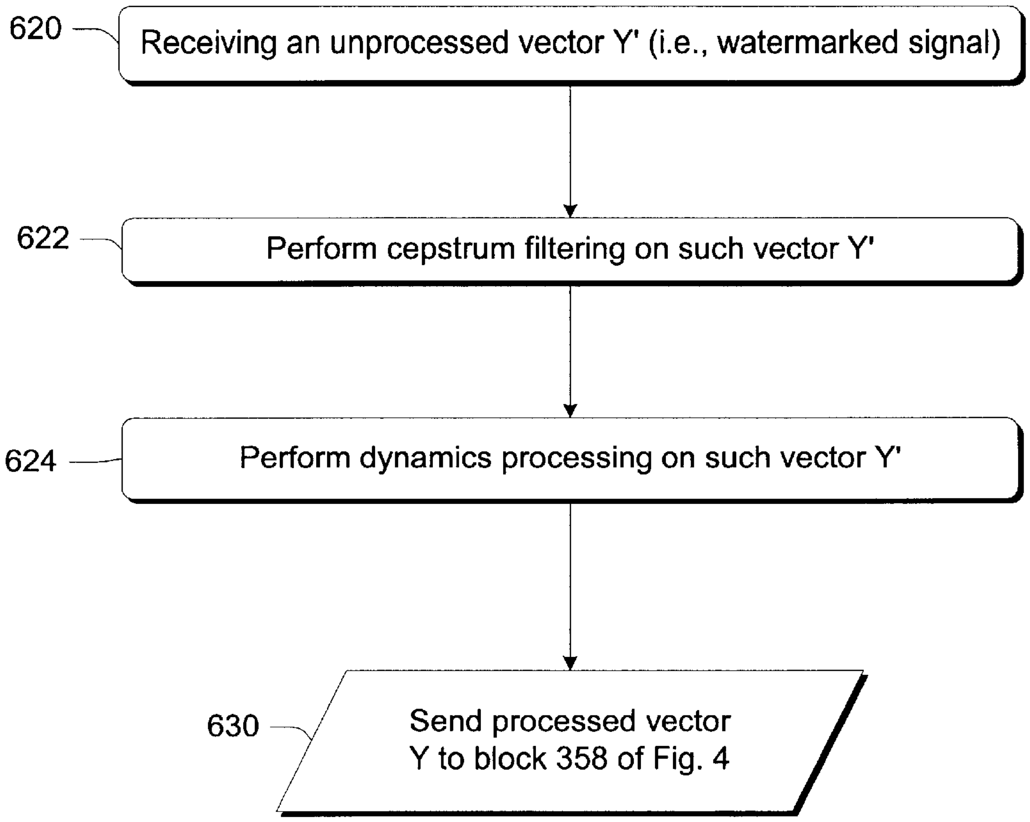
FIG. 7 is a flow diagram showing a methodological implementation of noise reduction using cepstrum filtering and dynamic processing.

Methodological Implementation of Exemplary Watermark Detection with Cepstrum Filtering and Dynamics Processing FIG. 7 shows a methodological implementation of the exemplary watermark detection with cepstrum filtering and dynamics processing performed by the watermark detector 130. This methodological implementation may be performed in software, hardware, or a combination thereof.

In particular, this methodological implementation generates a noise-reduced vector Y, which is provided to block 358 of the process illustrated in FIG. 4. Therefore, the watermark detection method shown in FIG. 4 examines a pre-processed watermarked signal, y'(A). The exemplary noise-reduction pre-processing includes the exemplary cepstrum filtering and exemplary dynamics processing described herein.

At 620, the exemplary watermark detector receives an unprocessed audio signal y'(k) that is suspected of containing a watermark (i.e., watermarked signal). This may be called an unprocessed vector Y'. Although some preliminary processing is performed on the signal to generate blocks and frequency magnitudes, such preliminary processing is not considered for this discussion.

At 622, the exemplary watermark detector performs cepstrum filtering of the vector Y' in accord with the above description of such cepstrum filtering. At 624, the exemplary watermark detector performs dynamics processing of the vector Y' (after it has been cepstrum filtered) in accord with the above description of such dynamics processing. Such cepstrum filtering and dynamics processing may be performed in any order.

At 630, the resulting vector Y (after dynamics processing and cepstrum filtering) is sent to block 358 of the methodological implementation of FIG. 4 as such vector is needed. Therefore, the exemplary watermark detector will examine the watermark signal after it has been dynamically processed and cepstrum filtered.

Exemplary Computing System and Environment

FIG. 8 illustrates an example of a suitable computing environment 900 within which an exemplary watermark detector, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary watermark detector may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary watermark detector may be described in the general context of computer-executable instructions, such as program modules, being executed by a computer. Generally, program modules include routines, programs, objects, components, data structures, etc. that perform particular tasks or implement particular abstract data types. Exemplary watermark detector may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 8 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of pattern generator; a correlation module; a watermark pre-processor; a random operator; and a watermark detector.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary watermark detector may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 8 illustrates an example of a suitable operating environment 900 in which an exemplary watermark detector may be implemented. Specifically, the exemplary watermark detector(s) described herein may be implemented (wholly or in part) by any program modules 928–930 and/or operating system 928 in FIG. 8 or a portion thereof.

The operating environment is only an example of a suitable operating environment and is not intended to suggest any limitation as to the scope or use of functionality of the exemplary watermark detector(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary watermark detector may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An audio watermark detection system, comprising:

a pattern generator to generate a watermark (w) comprised of two defined values (a and b); and a correlation module to detect whether the watermark is present in a watermarked audio signal (y), wherein the correlation module computes a cardinality-scaled correlation (CSC) value from the watermarked audio signal and from the watermark based upon: a difference between the sum of signal samples of y for which the corresponding watermark bit w matches a divided by the cardinality of watermark samples matching a, and the sum of signal samples of y for which the corresponding watermark bit w matches b divided by the cardinality watermark samples equal to b.

2. A system as recited in claim 1, wherein a is one (1) and b is zero (0).

3. A system as recited in claim 1, wherein the watermarked audio signal has a high ratio of noise to the watermark, the system further comprising a watermark pre-processor to reduce such noise in the watermarked signal.

4. A system as recited in claim 3, wherein the preprocessor cepstrum filters the watermarked signal.

5. A system as recited in claim 3, wherein the preprocessor non-linearly modifies the watermarked signal such that the low-energy frequency amplitudes are attenuated and the high-energy frequency amplitudes are amplified.

6. A system as recited in claim 3, wherein the CSC value computed by the correlation module tends toward a first value when the watermark is present and towards a second value when the watermark is not present.

7. A system as recited in claim 6, wherein the first value is one (1) and the second value is zero (0).

8. A system as recited in claim 1, further comprising:

a random operator for generating a random value; and the correlation module computes the CSC value from the watermarked audio signal and detects the presence of the watermark based on whether the CSC value exceed a predetermined threshold plus the random value.

9. An operating system comprising an audio watermark detection system as recited in claim 1.

10. An audio watermark detection system comprising:

a pattern generator to generate a watermark encoded as a sequence of values selected from a set of values; and a watermark detector to detect presence of the watermark encoded into the frequency domain of an digital signal, wherein the detector detects the presence of the watermark by tracking:

sum of occurrences of given values in the signal conditioned upon the watermark and the signal; and cardinality of such occurrences of the same given values in the watermark itself.

11. An audio watermark detection system as recited in claim 10, wherein the watermark detector computes a cardinality-scaled correlation (CSC) value from the digital signal and of the watermark and detects the presence of the watermark based on whether the CSC value exceeds a predetermined threshold.

12. An audio watermark detection system as recited in claim 10, further comprising:

a random operator for generating a random value; and the watermark detector computes cardinality-scaled correlation (CSC) values from the digital signal and each of the watermark and detects the presence of the watermark based on whether the CSC value exceed a predetermined threshold plus the random value.

13. A method of detecting presence of a watermark in an audio signal, the method comprising:

generating a watermark a watermark (w) comprised of two defined values (a and b); and computing a cardinality-scaled correlation (CSC) value to detect whether the watermark is present in a watermarked audio signal (y), wherein the CSC value is computed from the watermarked audio signal and from the watermark based upon:

$$\frac{\text{sum}(y \mid w = a)}{\text{card}(w = a)} - \frac{\text{sum}(y \mid w = b)}{\text{card}(w = b)}$$

14. A method as recited in claim 13, wherein a is one (1) and b is zero (0).

15. A method as recited in claim 13, wherein the watermarked audio signal has a high ratio of noise to the watermark, the method further comprising noise-reduction pre-processing of the watermarked signal to reduce such noise.

16. A method as recited in claim 15, wherein the preprocessing includes cepstrum filtering of the watermarked signal.

17. A method as recited in claim 15, wherein the preprocessing includes non-linearly modifying the watermarked signal such that the low-energy frequency amplitudes are attenuated and the high-energy frequency amplitudes are amplified.

18. A method as recited in claim 13, further comprising detecting presence of watermark based upon whether the CSC value exceed a predetermined threshold.

19. A method as recited in claim 13, further comprising detecting presence of the watermark by examining the CSC value computed by the computing, such that the CSC value tends toward a first value when the watermark is present and towards a second value when the watermark is not present.

20. A method as recited in claim 19, wherein the first value is one (1) and the second value is zero (0).

21. A method as recited in claim 13, further comprising:

generating a random value; and detecting the presence of the watermark based upon whether the CSC value exceed a predetermined threshold plus the random value.

22. A computer-readable medium having computer-executable instructions that, when executed by a computer, performs the method as recited in claim 13.

23. A computer-readable medium having computer-executable instructions that, when executed by a computer, perform a method of detecting a watermark in an audio signal, the method comprising:

generating a watermark encoded as a sequence of values selected from a set of values; and detecting presence of the watermark encoded into the frequency domain of the digital signal, wherein the presence of the watermark is determined by tracking:

sum of occurrences of given values in the signal conditioned upon the watermark and the signal; and cardinality of such occurrences of the same given values in the watermark itself to calculate a cardinality-scaled correlation (CSC) value which indicates the presence of the watermark if the CSC value exceeds a threshold.

24. A modulated signal indicating whether a watermark is present within an audio signal, the modulated signal generated in accordance with the following acts:

generating a watermark; and detecting presence of the watermark encoded into the frequency domain of the digital signal, wherein the presence of the watermark is determined by tracking:

sum of occurrences of given values in the signal conditioned upon the watermark and the signal; and cardinality of such occurrences of the same given values in the watermark itself;

to calculate a cardinality-scaled correlation (CSC) value which indicates the presence of the watermark if the CSC value exceeds a threshold.

25. A watermark detection system comprising:

a pattern generator to generate a watermark;

a random operator for generating a random value; and a correlation module to detect whether the watermark is present in an audio signal, wherein the correlation module:

computes a cardinality-scaled correlation (CSC) value from the audio signal and from the watermark; and detects the presence of the watermark based on whether the CSC value exceed a predetermined threshold plus the random value.

26. A watermark detection method comprising:

generating a watermark;

generating a random value; and determining whether the watermark is present in an audio signal by computing a cardinality-scaled correlation (CSC) value from the audio signal and from the watermark and detecting the presence of the watermark based on whether the CSC value exceed a predetermined threshold plus the random value.

27. A computer-readable medium having computer-executable instructions that, when executed by a computer, performs the method as recited in claim 26.

28. An audio watermark detection system, comprising:

a pattern generator to generate a watermark (w) comprised of two defined values (a and b); and a correlation module to detect whether the watermark is present in a watermarked audio signal (y), wherein the correlation module computes a cardinality-scaled correlation (CSC) value from the watermarked audio signal and from the watermark based upon:

$$\frac{\text{sum}(y \mid w = a)}{\text{card}(w = a)} - \frac{\text{sum}(y \mid w = b)}{\text{card}(w = b)}$$

29. An audio watermark detection system, comprising:

a pattern generator to generate a watermark (w) comprised of two defined values (a and b); and a correlation module to detect whether the watermark is present in a watermarked audio signal (y), by computing a cardinality-scaled correlation (CSC) value from the watermarked audio signal and from the watermark, wherein the CSC value is computed as a difference between a first CSC value based on an assumption that w=a and a second CSC value based on an assumption that w=b.

30. A system as recited in claim 29, wherein a is one (1) and b is zero (0).

31. A system as recited in claim 29, wherein the watermarked audio signal has a high ratio of noise to the watermark, the system further comprising a watermark pre-processor to reduce such noise in the watermarked signal.

32. A system as recited in claim 31, wherein the pre-processor cepstrum filters the watermarked signal.

33. A system as recited in claim 31, wherein the pre-processor non-linearly modifies the watermarked signal such that the low-energy frequency amplitudes are attenuated and the high-energy frequency amplitudes are amplified.

34. A system as recited in claim 31, wherein the CSC value computed by the correlation module tends toward a first value when the watermark is present and towards a second value when the watermark is not present.

35. A system as recited in claim 34, wherein the first value is one (1) and the second value is zero (0).

36. A system as recited in claim 29, further comprising:

a random operator for generating a random value; and the correlation module computes the CSC value from the watermarked audio signal and detects the presence of the watermark based on whether the CSC value exceed a predetermined threshold plus the random value.

37. An operating system comprising an audio watermark detection system as recited in claim 29.

* * * * *

UNITED STATES PATENT AND TRADEMARK OFFICE

CERTIFICATE OF CORRECTION

PATENT NO. : 6,738,744 B2 Page 1 of 1
DATED : May 18, 2004
INVENTOR(S) : Kirovski et al It is certified that error appears in the above-identified patent and that said Letters Patent is hereby corrected as shown below:

Column 2,
Line 4, replace "addition" with -- additional --.

Column 7,
Line 12, replace "Comples" with -- Complex --.

Column 11,
Line 58, replace "if" with -- of --.

Signed and Sealed this

Thirty-first Day of August, 2004

JON W. DUDAS
*Director of the United States Patent and Trademark Office*